(12) United States Patent
Boppart et al.

(10) Patent No.: US 10,380,924 B2
(45) Date of Patent: Aug. 13, 2019

(54) ILLUMINABLE DISPLAY ELEMENT AND METHOD FOR PRODUCING SUCH A DISPLAY ELEMENT

(71) Applicant: WEIDPLAS GmbH, Rapperswil (CH)

(72) Inventors: Martin Boppart, Staefa (CH); Steffen Reuter, Uerikon (CH); Stefan Harke, Wollerau (CH)

(73) Assignee: WEISPLAS GmbH, Rapperswil (CH)

( * ) Notice: Subject to any disclaimer, the term of this patent is extended or adjusted under 35 U.S.C. 154(b) by 268 days.

(21) Appl. No.: 14/761,482

(22) PCT Filed: Jan. 31, 2014

(86) PCT No.: PCT/EP2014/051922
§ 371 (c)(1),
(2) Date: Jul. 16, 2015

(87) PCT Pub. No.: WO2014/122078
PCT Pub. Date: Aug. 14, 2014

(65) Prior Publication Data
US 2015/0356895 A1    Dec. 10, 2015

(30) Foreign Application Priority Data

Feb. 6, 2013    (EP) ..................... 13154130

(51) Int. Cl.
*B29C 45/14*     (2006.01)
*B60Q 1/56*      (2006.01)
*G09F 13/04*     (2006.01)
*G09F 13/06*     (2006.01)
*G09F 13/10*     (2006.01)
(Continued)

(52) U.S. Cl.
CPC .......... *G09F 13/04* (2013.01); *B29C 45/1418* (2013.01); *B60Q 1/56* (2013.01);
(Continued)

(58) Field of Classification Search
CPC ....... B60Q 3/217; B60Q 1/56; F21Y 2115/20; F21S 41/155; F21S 8/10; B29C 45/14; G09F 13/04
See application file for complete search history.

(56) References Cited

U.S. PATENT DOCUMENTS 2,623,315 A     12/1952  Owen et al.
2,886,911 A *   5/1959   Hardesty ................. G09F 13/18
                                                   116/DIG. 36
(Continued)

FOREIGN PATENT DOCUMENTS

CH     702 730 A1    8/2011
EP     2 295 293 A1  3/2011

OTHER PUBLICATIONS

International Search Report for PCT/EP2014/051922 dated Feb. 19, 2014 [PCT/ISA/210].
(Continued)

*Primary Examiner* — Jong-Suk (James) Lee
*Assistant Examiner* — Eric T Eide
(74) *Attorney, Agent, or Firm* — Sughrue Mion, PLLC

(57) ABSTRACT

The invention relates to an illuminable display element, in particular for a vehicle, which display element comprises a planar cover (1). The planar cover has a visible side (10), a rear side (11), and at least one opening (14). The display element also comprises at least one graphic element (2), which is provided and/or formed on the visible side (10) of the cover (1), and a lighting means (3), which is used to illuminate the opening (14). The graphic element (2) is at least partially surrounded by the at least one opening (14) in such a way the graphic element (2) can be at least partially peripherally illuminated by the light of the lighting means (3). The cover (1) comprises at least one elevation (12) extending upward, within which the graphic element (2) is arranged above the at least one opening (14), and/or the
(Continued)

cover (1) comprises at least one recess (13) extending downward, within which the graphic element (2) is arranged below the at least one opening (14).

17 Claims, 7 Drawing Sheets

(51) Int. Cl.
*F21S 45/10* (2018.01)
*B29K 101/12* (2006.01)
*B29L 31/30* (2006.01)

(52) U.S. Cl.
CPC .......... *F21S 45/10* (2018.01); *G09F 13/0404* (2013.01); *G09F 13/06* (2013.01); *G09F 13/10* (2013.01); *B29C 2045/14213* (2013.01); *B29K 2101/12* (2013.01); *B29L 2031/3005* (2013.01); *G09F 2013/044* (2013.01); *G09F 2013/049* (2013.01)

(56) References Cited

U.S. PATENT DOCUMENTS

| | | | | |
|---|---|---|---|---|
| 4,140,405 A | * | 2/1979 | Shapiro | G09F 13/06 40/552 |
| 4,783,920 A | * | 11/1988 | Muller-Tolk | G09F 13/28 362/240 |
| 2006/0061138 A1 | * | 3/2006 | Radu | B29C 45/14778 296/201 |
| 2007/0227055 A1 | | 10/2007 | Lapointe | |
| 2008/0025039 A1 | * | 1/2008 | Guillermo | A42B 3/044 362/556 |
| 2008/0259641 A1 | * | 10/2008 | Suzuki | G02B 5/045 362/612 |
| 2011/0116286 A1 | * | 5/2011 | Rudek | G02B 6/001 362/615 |
| 2011/0228553 A1 | * | 9/2011 | Igoe | B60R 13/0243 362/558 |
| 2013/0155708 A1 | * | 6/2013 | Moberg | B60Q 3/0216 362/488 |
| 2013/0272005 A1 | * | 10/2013 | Yang | B60Q 3/82 362/487 |

OTHER PUBLICATIONS

Written Opinion for PCT/EP2014/051922 dated Feb. 19, 2014 [PCT/ISA/237].
International Preliminary Report on Patentability dated Aug. 11, 2015, issued by the International Bureau in corresponding International Application No. PCT/EP2014/051922.

* cited by examiner

ILLUMINABLE DISPLAY ELEMENT AND METHOD FOR PRODUCING SUCH A DISPLAY ELEMENT

CROSS REFERENCE TO RELATED APPLICATIONS

This application is a National Stage of International Application No. PCT/EP2014/051922 filed Jan. 31, 2014, claiming priority based on European Patent Application No. 13154130.2 filed Feb. 6, 2013, the contents of all of which are incorporated herein by reference in their entirety.

TECHNICAL FIELD

The present invention relates to an illuminable display element, in particular for a vehicle. Such display elements are used for example as a foot or sill strip, trim strip or decorative element. The invention furthermore relates to a method for producing such a display element.

PRIOR ART

In vehicles, and in particular motor vehicles, for example automobiles, it is conventional to provide display elements which may be used for a very wide variety of purposes. In order to improve the optical perception of the display elements, particularly at night, they are usually configured to be illuminable. Display elements are, in particular, often also provided in the region of the doors and trunk lid, for example in order to mark the height of the foot strip and/or represent a brand name. Display elements also occur, however, in the form of operating elements, for example buttons.

An illuminable display element, which comprises a decorative element having openings in the form of script, is disclosed in EP 2 295 293. An optically transmissive foil applied on the rear side of the decorative element engages in the openings and can be illuminated there by means of a lighting element.

An illuminable component having a two-dimensionally extending decorative element, which comprises an optically opaque region and an optically transparent region which can be illuminated by an illumination means, is presented in CH 702 730.

Particularly in vehicles, it is desirable to attract the attention of the passengers, and in particular the attention of the driver, situation-dependently to certain display elements. This may, for example, be the button of the hazard warning light, which is intended to be actuated in the event of rapid braking of the vehicle in order to warn vehicles which may be following. Display elements for representing warning indications, for example in order to indicate a low fuel level or an engine defect, also need increased attention from the driver. It may, however, also be desirable for example to provide with graphical elements, and to illuminably configure, decorative elements and in particular sill strips in the region of the doors, the trunk or the central console, for example in order to indicate the manufacturer brand. Owing to the presence of in general very many already illuminated display elements in the vehicle, however, attracting attention precisely to a specific display element represents a difficulty.

SUMMARY OF THE INVENTION

It is thus an object of the present invention to specify an illuminable display element having improved optical perceptibility.

Position and direction indications such as above, below, vertical, horizontal, upward and downward are respectively to be understood in what follows in relation to the at least one elevation or depression formed in the display element. By definition, the at least one elevation extends upward, or the at least one depression extends downward. In this case, the visible side of the display element is usually arranged above and the rear side below. The location and position in which the display element is actually mounted in relation to the direction of gravity, for example in a vehicle, is in this case unimportant.

The present invention thus provides an illuminable display element, in particular for a vehicle, comprising
a two-dimensionally extending cover with a visible side, a rear side and at least one opening;
at least one graphical element which is provided and/or formed on the visible side of the cover; and
a lighting element which is used to illuminate the opening.

In this case, the graphical element is at least partially enclosed by the at least one opening in such a way that light from the lighting element can at least partly shine around the graphical element. The cover has at least one elevation extending upward, within which the graphical element is arranged above the at least one opening, and/or the cover has at least one depression extending downward, within which the graphical element is arranged below the at least one opening.

By virtue of the illuminable opening which at least partially encloses, and in particular at least partially or fully borders, the graphical element, light from the lighting element can at least partially shine around the graphical element, which is therefore highlighted in the perception of the observer in comparison with other display elements. The graphical element is, in particular, framed by light from the lighting element. In the event that the graphical element is arranged or formed within an elevation, the opening arranged below the graphical element leads, in particular, to an optical effect such that the graphical element is raised relative to the surface of the cover which encloses the elevation, or is even floating thereabove. In the event that the graphical element is arranged or formed within a depression, the opening arranged above the graphical element correspondingly leads to the optical effect that the graphical element seems to be set back behind the part of the cover which encloses the depression. In both cases, the graphical element thus appears in particular as if it were separated from the enclosing cover. The optical effect generated in this way leads to a more conspicuous appearance of the display element. The display element therefore draws the attention of the observer to itself, so that the optical perceptibility of the display element is improved.

The display element, which may conventionally also be referred to as a decorative element, is preferably configured as a trim strip, an operating element, for example a button, and particularly preferably as a foot or sill strip of a vehicle. The vehicle is preferably a motor vehicle, and particularly preferably a road motor vehicle. The illuminable display element may be provided in the inner region and/or in the outer region of the vehicle. The illuminable display element may, however, for example also be configured as a trim strip or an operating element of a domestic appliance, for example a refrigerator, a steamer, a washing machine, an oven, a hob, a dishwasher or a piece of furniture.

The feature that the cover of the display element is configured to be two-dimensionally extending means that the cover is dimensioned to be substantially larger, in particular a multiple larger, along two dimensions than along a third dimension, which generally extends perpendicularly to the surface extent of the visible side of the cover. The cover is configured for example in the shape of a band, in particular as a band. Advantageously, the visible side of the cover comprises a region essentially configured in a planar fashion which extends at least partially, preferably fully, around the at least one graphical element. If a plurality of graphical elements are provided, this region furthermore particularly advantageously also extends at least partially, preferably fully, also between the graphical elements.

The at least one opening is generally configured as a continuous opening in the cover. This opening is advantageously laterally enclosed by the material of the cover. If only a single opening is provided, it is usually configured elongately with a longitudinal extent which is substantially greater, in particular a multiple greater, along a first direction than along a second direction, which is for example perpendicular to the first direction. Thus, the opening is then configured for example as an elongate hole or as a slit. In this case, this single opening at least partially or fully encloses the graphical element. If a plurality of openings are provided, these are usually arranged in such a way that together they at least partially enclose the graphical element.

The graphical element may for example be a symbol, an ornament, a letter, script or a logo. The graphical element may be configured, or formed, by at least a part of the cover. It may, however, for example also be formed by at least one layer applied onto the visible side of the cover. The at least one layer is applied for example by printing, gas phase deposition, for example sputtering, or adhesive bonding. The graphical element may, however, also be formed in or on the visible side of the cover by means of punching or by means of a laser. Furthermore, it may be formed at least partially or even fully by a relief-like structure, formed in particular in the cover. Although the relief-like structure is then arranged within the elevation or depression, it preferably constitutes an independent separate structure in relation thereto, which is in particular dimensioned to be substantially smaller, in a direction perpendicular to the surface extent of the visible layer, than the elevation or depression. The height of the relief-like structure, which is intended to mean the maximum extent of the relief-like structure along the vertical direction, or along the direction perpendicular to the visible side of the cover, is preferably at most equally large, more preferably at most one tenth as large, and most preferably at most one fiftieth as large, as the vertical height of the elevation or depression, i.e. the extent of the elevation or depression along the vertical direction. Within the relief-like structure, it is possible in particular to provide a material whose color and/or surface structure differs from the material of the cover. This material may, for example, be placed in the relief-like structure in the region of the visible side.

According to one refinement of the invention, the illuminable display element has a total thickness, or a longitudinal extent in the vertical direction, of 15 millimeters or less. If the graphical element is formed by a relief-like structure, this may for example have a vertical height of 2 millimeters or less, but preferably 1.5 millimeters or less, more preferably 1 millimeter or less, even more preferably 0.5 millimeter or less, and most preferably 0.25 millimeter or less.

According to one refinement of the invention, the lighting element is arranged in the region of the rear side of the cover.

The lighting element may, in particular, comprise one or more light-emitting diodes, which are preferably arranged in the region of the rear side of the cover. Also possible, for example, is a luminous foil, in particular an electroluminescent foil or OLED, or an incandescent bulb.

Preferably, the cover is formed overall in one piece. The display element is therefore simple to produce and has an optically attractive configuration. The cover is preferably made of a metal, for example aluminum, steel or stainless steel. It may, however, also be made of plastic or another material, for example wood. The cover is for example configured in the shape of a band, or as a band. In the case of metal or plastic, the cover is for example a flexible foil or a self-supporting component. In the case of metal, a self-supporting component is for example a metal sheet. If the cover is made of plastic, the cover may be at least partially translucent. According to one refinement of the invention, the cover has a thickness of one millimeter or less. The aforementioned wood is produced, for example, by arranging the wood in an autoclave and introducing steam, which acts on the wood, into the autoclave. After removal of the steam-treated wood from the autoclave, the processed wood is shaped and then dried.

Preferably, the elevation and/or the depression is for the most part, and in particular fully, enclosed by the at least one opening. If a plurality of elevations and/or depressions are provided, these are respectively preferably together for the most part, and in particular fully, enclosed by the at least one opening, and particularly preferably even the individual elevations and/or depressions are respectively individually enclosed for the most part, and in particular fully, by the at least one opening. This gives rise to a particularly conspicuous appearance of the display element, since the graphical element then appears to be framed.

Advantageously, the elevation has an upper surface, in particular a top surface, or the depression has a lower surface, in particular a bottom surface, within which the graphical element is arranged and which, in particular, is essentially configured in a planar fashion. The upper surface, in particular the top surface, or the lower surface, in particular the bottom surface, may, however for example also be configured convexly or concavely, or it may have a different shape. The elevation or depression furthermore preferably has an essentially circumferential side surface, which extends downward from this upper surface, in particular top surface, or upward from this lower surface, in particular bottom surface. The side surface therefore then connects the upper, in particular top, or lower, in particular bottom, surface to that region of the cover which encloses the elevation or depression. In this embodiment, the at least one opening is preferably arranged within this side surface. In relation to the upper, in particular top, or lower, in particular bottom, surface, the light emitted by the lighting element is then thus output laterally through the at least one opening. In this way, a particularly attractive and conspicuous optical effect is obtained. The elevation or depression may, in particular, be configured pyramidally or frustoconically. Advantageously, the upper, in particular top, or lower, in particular bottom, surface is configured as a quadrilateral, for example rectangular or square, or circular surface.

If the graphical element is a number or a letter or a symbol or an ornament or a logo, at least one elevation and/or at least one depression is advantageously respectively provided for each graphical element, i.e. for each number or each letter or for each symbol or for each ornament or for each logo. A full script may, however, also be provided within an individual elevation or depression.

The at least one opening may be arranged within and/or outside the elevation or depression. According to one refinement of the invention, however, the at least one opening is arranged within a side surface of the elevation and/or within a side surface of the depression.

According to one refinement of the invention, the at least one opening is arranged outside the elevation in a part of the cover which encloses, preferably borders, the elevation. According to one refinement of the invention, the at least one opening is arranged outside the depression in a part of the cover which encloses, preferably borders, the depression.

According to one refinement of the invention, the at least one opening is arranged in a lower region of the elevation, in the transition region of a side surface of the elevation to a part of the cover which encloses, preferably borders, the elevation. According to one refinement of the invention, the at least one opening is arranged in an upper region of the depression, in the transition region of a side surface of the depression to a part of the cover which encloses, preferably borders, the depression.

According to one refinement of the invention, the at least one opening is arranged within a ridge at least partially enclosing, preferably bordering, the elevation and/or within a groove or channel at least partially enclosing, preferably bordering, the elevation. According to one refinement of the invention, the at least one opening is arranged within a ridge at least partially enclosing, preferably bordering, the depression and/or within a depression at least partially enclosing, preferably bordering, the depression.

According to one refinement of the invention, the at least one opening is arranged within a region of the cover which is inclined toward an elevation in such a way that the elevation can be illuminated laterally by light from the lighting element. Preferably, the laterally illuminable elevation then has a side surface, which makes an angle of at most 120°, preferably at most 90° and particularly preferably at most 60° with said region of the cover. Such a configuration of the display element may, for example, be achieved by forming a channel or a groove adjacent to the elevation and at least partially around the latter in the cover, and by providing the at least one opening in a lateral wall region, arranged at a distance from the elevation, of this channel or of this groove. Instead of a channel or a groove, it is also possible to form a ridge extending at least partially around the elevation in the cover, the at least one opening then being arranged laterally in the region of a wall region, arranged close to the elevation, of the ridge. In this embodiment, the at least one opening is preferably arranged or configured in such a way that light which passes in a perpendicular direction through the opening strikes a side surface of the elevation directly. A special optical effect is thereby formed.

In one refinement, the at least one elevation and/or the at least one depression is configured in such a way that it forms the graphical element by virtue of its shape. Advantageously, in this embodiment, the elevation or depression has an essentially planar surface, the contours of which correspond to those of the graphical element. This surface of the elevation or of the depression may, however, for example also be configured convexly or concavely, or it may have a different shape.

According to one refinement of the invention, the elevation and/or depression may comprise at least one recess which can be illuminated by the lighting element and is configured in such a way that it at least partially, preferably fully, forms the graphical element. This recess can advantageously be illuminated by the lighting element so that the graphical element itself optically forms a lighting element, so that the perception of the graphical element in darkness is substantially improved.

Preferably, at least in the region of the at least one opening, the display element comprises at least one carrier layer, which is arranged on the rear side of the cover. If the display element furthermore comprises a recess, this carrier layer is preferably also arranged in the region of this recess on the rear side of the cover. The carrier layer may, in particular, engage in the at least one opening or the recess, if there is one. In particular, if the at least one opening fully encloses the graphical element, the carrier layer may be used to carry or hold the part of the cover provided with the graphical element. If the graphical element is formed by means of at least one recess in the cover and the graphical element furthermore comprises regions in the shape of islands, such as occur for example in the letters A and B, in contrast to the letters C and M, the carrier layer may furthermore be used in order to carry or hold the parts of the cover correspondingly configured in the shape of islands. The parts configured in the shape of islands are preferably made of the same material as the rest of the cover, although they may also be made of a different material. Preferably, the cover forms together with the at least one carrier layer a composite of at least two layers.

According to one refinement of the invention, at least in the region of the at least one opening, at least one foil, which in particular engages at least partially in the at least one opening, is applied on the rear side of the cover. If the cover comprises a recess, this foil is advantageously also applied on the rear side of the cover in the region of this recess, and particularly advantageously engages in this recess. Preferably, the cover forms together with the at least one foil a composite of at least two layers. By means of this foil, the display element can be externally sealed against contaminants such as dirt and water. According to one refinement of the invention, at least one foil is applied at least in the region of the at least one opening on the rear side of the cover, at least one carrier layer being applied on the rear side of the foil at least in the region of the at least one opening. Preferably, the cover, the at least one foil and the at least one carrier layer form a composite of at least three layers. An even more optically attractive configuration of the display element can furthermore be achieved by the engagement of the foil and/or of the carrier layer in the at least one opening. To this end, the foil or the carrier layer preferably engages in the opening and/or the recess to such an extent that the foil or the carrier layer is flush with the adjacent visible side of the cover in the region of the at least one opening and/or the recess. If an island-shaped region is embedded in the foil or in the carrier layer, the island-shaped region is preferably flush with the adjacent visible side of the cover. Preferably, the foil fills the opening at least partially, preferably fully. The foil is, in particular, a plastic foil. It may be colorless or white, or else colored. Colorful graphical elements may be produced using colored plastic foils. The foil may be in one layer or several layers. An embodiment having a plurality of foils, which are identical or different, is possible. According to one refinement of the invention, at least in regions the foil is translucent, or at least partially transparent for visible light. According to one refinement of the invention, the foil has a thickness in the range of from 1 millimeter to 0.05 millimeter, preferably from 0.1 millimeter to 0.3 millimeter. The foil is for example made of ABS, polycarbonate or PMMA.

In order to impart an optically uniform impression, the carrier layer and/or the foil comprises, at least in the region of the opening and/or in the region of the recess, if there is one, a surface coating which leads to at least approximately the same optical impression as the material of which the cover is made. In daylight, when the display element is not illuminated, the at least one opening or the recess is therefore less readily visible to the observer, so that the display element gives a more uniform, attractive impression for the observer. The foil may, in particular, be metallized.

The carrier layer and/or the foil are preferably respectively configured to be optically transparent at least in regions. Advantageously, the carrier layer and/or foil furthermore forms a light guide, which is used to guide light emitted by the lighting element to the at least one opening. The lighting element may in this case be arranged, in particular, in such a way that the emitted light can pass from the lighting element to the at least one opening only on an indirect path, i.e. via reflections. Correspondingly, reflection elements are advantageously provided on the light guide, which are configured and arranged in such a way that the light guided to the at least one opening changes its direction at least once. The carrier layer and/or the foil may, in particular, also be configured as a diffuser in order to scatter the light emitted by the lighting element. Preferably, a light guide, out of which light is coupled into the diffuser, is then arranged below the carrier layer and/or foil. Preferably, the lighting element is at least partially, preferably essentially fully, embedded in the light guide, and the light guide is in particular injection-molded around the lighting element. This allows a particularly compact design of the display element.

According to one refinement, the carrier layer is at least in regions translucent, or at least partially transparent for visible light. The carrier layer may be made of plastic, preferably of thermoplastic material and/or thermosetting material. Advantageously, the carrier layer has a thickness of 1 millimeter or more. Preferably, the at least one carrier layer has a maximum thickness of 10 millimeters. If the at least one carrier layer is made of thermoplastic by injection molding, the at least one carrier layer preferably has a maximum thickness of 10 millimeters, since with such a thickness rapid cooling of the carrier layer after its production is still possible.

According to one refinement of the invention, a protective layer, for example a foil, is arranged on the visible side of the cover at least in regions, preferably surface-wide. Preferably, the protective layer is separable from the visible side, in particular separable by hand. Preferably, the protective layer is transparent.

A method is furthermore specified for producing an illuminable display element having a graphical element, in particular an illuminable display element as specified above, comprising at least the following steps:

providing a two-dimensionally extending cover;
forming at least one elevation extending upward and/or at least one depression extending downward in the cover by means of shaping the cover; and
forming at least one opening in the cover.

The elevation and/or the depression are in this case configured and/or arranged in such a way that the graphical element is arranged within the elevation or depression. The graphical element and the at least one opening are arranged and configured with respect to one another in such a way that the at least one opening is arranged below the graphical element in the case of an elevation and above the graphical element in the case of a depression, and at least partially encloses this element.

The step mentioned second, relating to the formation of an elevation or depression, and the step mentioned third, relating to the formation of at least one opening, may be carried out as desired in the order indicated or in the reverse order.

The shaping of the cover may for example be achieved by means of deep drawing, stamping, for example with a die and a male form, or hydroforming. Advantageously, however, the method furthermore comprises the step that, in particular by means of applying plasticized material, in particular plastic, under pressure, for example by injection molding or by extrusion, a carrier layer is applied at least in regions on the rear side of the cover, preferably at least in the region of the at least one opening, more preferably on the entire rear side of the cover and in the region of the at least one opening.

Preferably, by means of applying plasticized material, in particular plastic, under pressure, for example by injection molding or by extrusion, a carrier layer is applied at least in regions onto a foil arranged on the rear side of the cover, preferably at least in the region of the at least one opening.

According to one refinement of the invention, the carrier layer is in this case applied under pressure on the rear side of the cover in such a way that the at least one elevation and/or the at least one depression is formed in the cover because of this pressure. The production method is therefore particularly simple and economical.

According to one refinement of the invention, the carrier layer is applied on the rear side of the cover in such a way that carrier layer engages at least partially in the at least one opening. A foil may furthermore be provided between the cover and the carrier layer. The foil and/or carrier layer may be applied on the rear side of the cover for example by means of an adhesive or an adhesion promoter.

According to one refinement of the invention, the illuminable display element, in particular the carrier layer, comprises fastening means for fastening the display element on a surface of the vehicle, in particular for fastening on a surface of the bodywork.

BRIEF DESCRIPTION OF THE DRAWINGS

Preferred embodiments of the invention are described below with the aid of the drawings, which merely serve for explanation and are not to be interpreted as restrictive. In the drawings.

DESCRIPTION OF PREFERRED EMBODIMENTS

Figure 1:
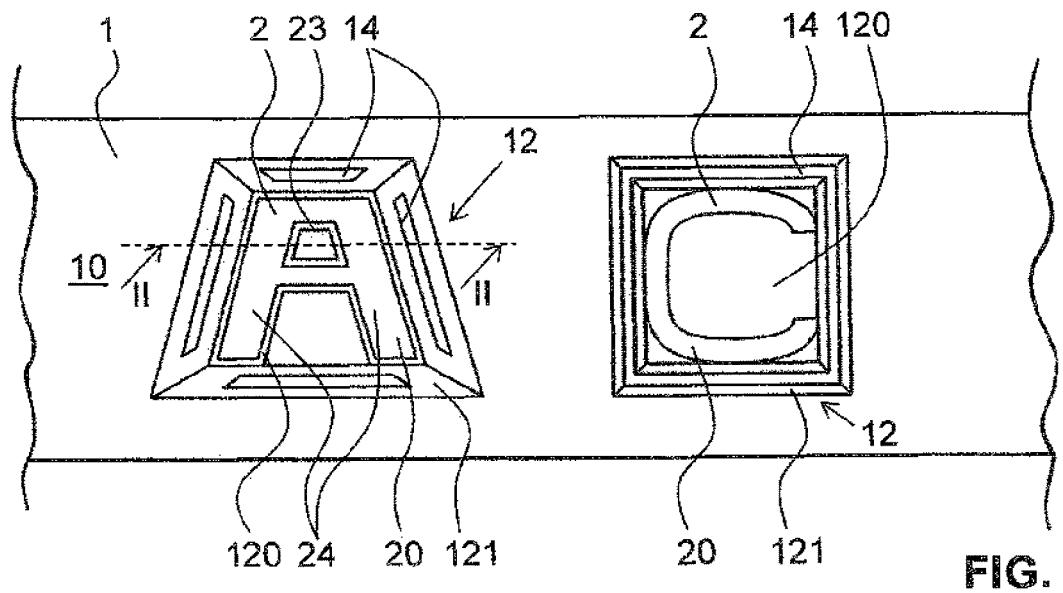
FIG. 1 shows a partial view from above of an illuminable display element according to a first embodiment according to the invention.
Figure 2:
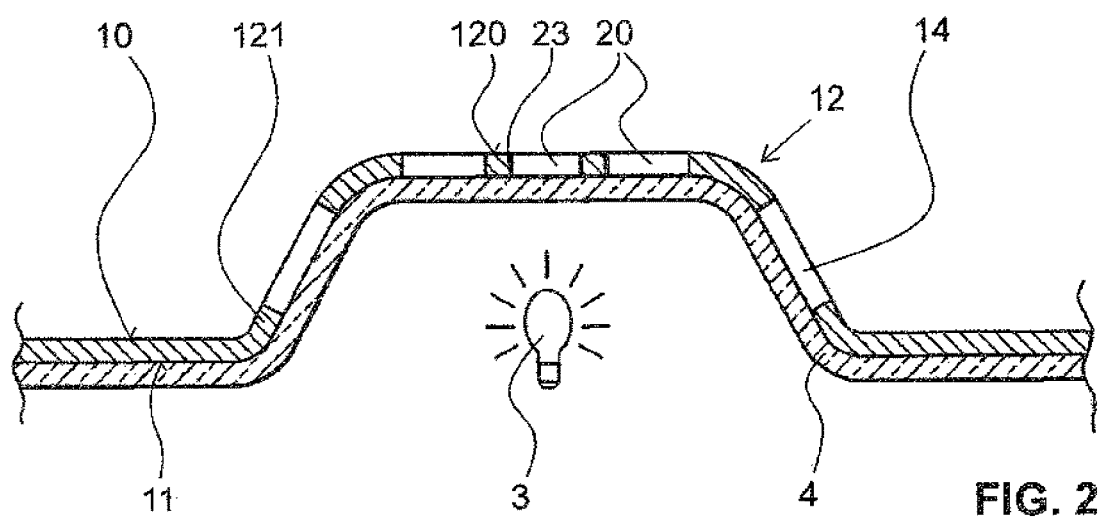
FIG. 2 shows a cross-sectional view along the line II-II through a part of the display element shown in FIG. 1.

FIGS. 1 and 2 show a first embodiment of an illuminable display element according to the invention. Further embodiments and variants of illuminable display elements according to the invention are shown in FIGS. 3 to 20. Elements of the display element which have the same effect or a similar effect are respectively denoted by the same references in the various embodiments. The display elements shown in FIGS. 1 to 20 may in particular be trim strips, sill strips or foot strips, which are applied in particular in vehicles.

The display element shown in FIGS. 1 and 2 comprises an overall two-dimensionally extending cover 1 with a visible side 10, which can be seen in FIG. 1, and a rear side 11.

The cover 1 comprises two elevations 12 extending upward. These elevations 12 are respectively configured frustopyramidally and respectively comprise an upper surface 120 configured in a planar fashion as well as a side surface 121 extending circumferentially downward from the latter. The side surface 121 in this case widens downward slightly. A recess 20, which forms a graphical element 2 in the form of the letter A or C, is respectively formed within the upper surface 120. The recess 20 could, of course, also have the shape of any other letter, script, a number, an ornament, a symbol or any other graphical element.

In the present exemplary embodiment, one of the graphical elements 2, namely the one which represents the letter A, has an island-shaped region 23, i.e. a region which is fully enclosed by the graphical element 2. In this island-shaped region 23, the cover 1 has an additional recess. Further recesses may be present within the upper surface 120, particularly in the region between the two branches 24 formed by the letter A, so that the recesses in total make up a large part of the surface content in relation to the upper surface 120.

Figure 3:
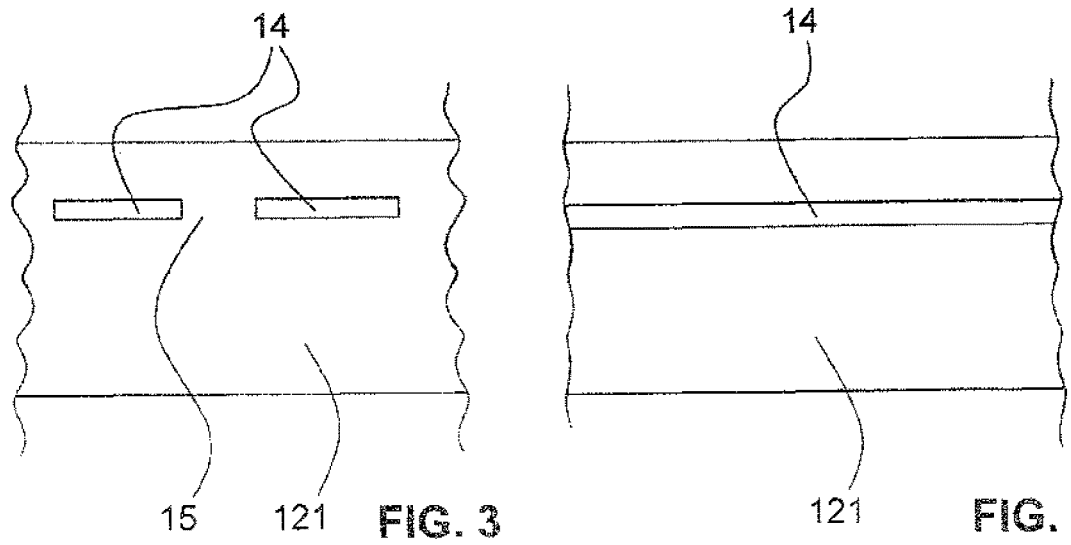
FIG. 3 shows a lateral partial view of the side surface of an elevation formed in the cover of a display element according to the invention in a first variant.
Figure 4:
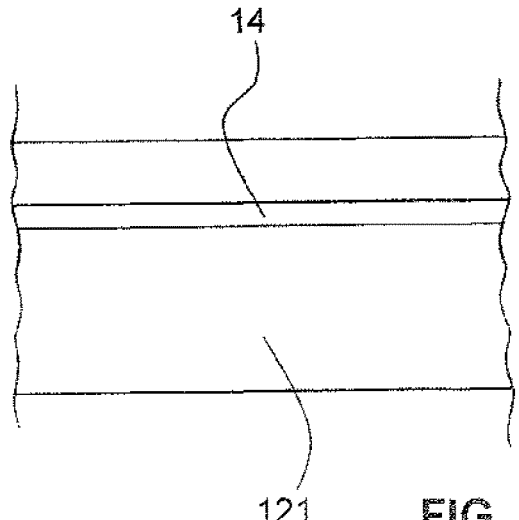
FIG. 4 shows a lateral partial view of the side surface of an elevation formed in the cover of a display element according to the invention in a second variant.

Within the side surfaces 121, openings 14 are respectively formed which have the shape of slits. In the case of the elevation 12 shown on the left-hand side in FIG. 1, with the graphical element 2 in the shape of an A, four openings 14 are provided, which together at least partially enclose the graphical element 2. An opening 14 is arranged on each of the four sides of the frustoconical elevation 12. It is possible to provide an even greater number of openings 14, which together enclose a graphical element 2 and which, as shown in FIG. 3, are respectively separated from one another by a web 15. Preferably, these openings 14 are arranged at regular distances from one another. As shown on the right-hand side of FIG. 1 for the elevation with the graphical element 2 in the form of a C, there may however also be only a single circumferential opening 14, which fully encloses the graphical element 2 or the recess 20, in the side surface 121. Such an opening 14 is also shown in FIG. 4.

The cover 1 may for example be made of plastic, wood, or, as in the present exemplary embodiment, a metal, in particular aluminum or steel, in particular stainless steel. Owing to its production from a metal, the cover is configured to be optically opaque in this case. Except for the parts fully enclosed by a recess 20 or an opening 14, the cover 1 is formed overall in one piece.

As can be seen from FIG. 2, a carrier layer 4 is applied on the rear side 11 of the cover 1. This carrier layer 4 extends over the entire rear side 11 of the cover 1, and in particular also over the regions of the openings 14 and of the recesses 20. The carrier layer 4 is used, in particular, for carrying or holding parts of the cover 1 which are fully enclosed by an opening 14 or a recess 20. For the elevation 12 with the graphical element 2 in the shape of an A, this applies in this case to the island-shaped region 23, and for the elevation 12 with the graphical element 2 in the shape of a C to the entire region arranged inside the opening 14, and therefore in particular to the entire upper surface 120. The presence of a carrier layer 4 furthermore prevents dirt particles and/or moisture from being able to enter the interior of the display element.

In the present exemplary embodiment, the carrier layer 4 is made of a plastic injection-molded onto the rear side 11 of the cover 1. This plastic is, in particular, configured to be optically transmissive.

Provided on the rear side of the cover 1 there is a lighting element 3, which is arranged in such a way that the light emitted illuminates both the openings 14 and the recesses 20. To this end, a plurality of lighting element 3 may be provided, for example one for each of the elevations 12, or the lighting element may be arranged in such a way that all the openings 14 and recesses 20 can be illuminated. The light emitted by the lighting element 3 can therefore emerge outward through the openings 14 and the recesses 20. The graphical elements 2 can therefore be seen clearly, particularly in darkness, and furthermore they are respectively enclosed at least partially by the emitted light because of the openings 14. Since the openings 14 are respectively arranged below the graphical element 2 or the recess 20, the graphical elements 2 appear to the observer as being raised relative to the visible side 10 of that part of the cover 1 which encloses the elevations 12, or even floating thereabove. The display element therefore attracts the attention of the observer to itself.

In order to produce the illuminable display element, for example in a first step a band-shaped material intended for the cover 1 may be brought into a correspondingly configured mold and a plastic may be injection-molded around it therein under pressure. In this case, in particular, it is possible to apply a pressure which is so high that the band-shaped material is deformed because of the pressure and the elevations 12 are formed. The shapes of the elevations 12 are already correspondingly predetermined in the mold used. The plastic then forms the carrier layer 11. Subsequently, the openings 14 and the recesses 20 may be formed, for example by using a laser. It would, however, also be possible first to form the openings 14 and the recesses 20, for example by means of punching, before shaping the elevations 12, for example by means of a die and a male form, and subsequently to apply the carrier layer 11. The parts of the cover 1 which are fully enclosed by a recess 20 or by an opening 14 would in this case naturally need to be held in position by suitable means after the formation of the openings 14 or recesses 20 until the application of the carrier layer 4.

Figure 5:
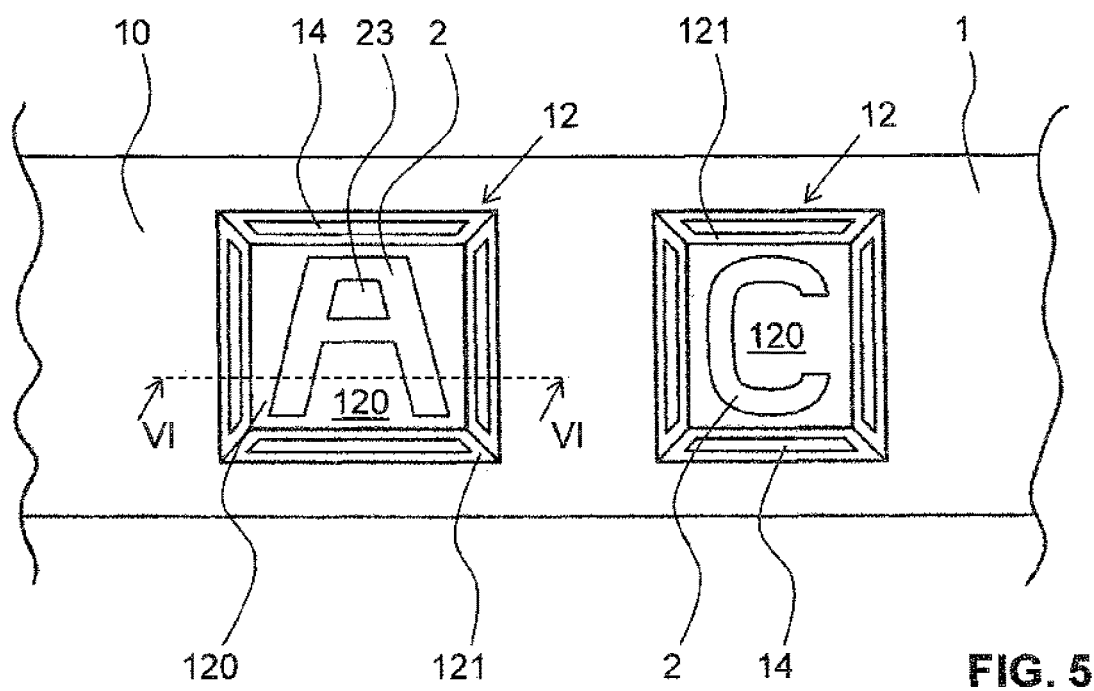
FIG. 5 shows a partial view from above of an illuminable display element according to a second embodiment according to the invention.
Figure 6:
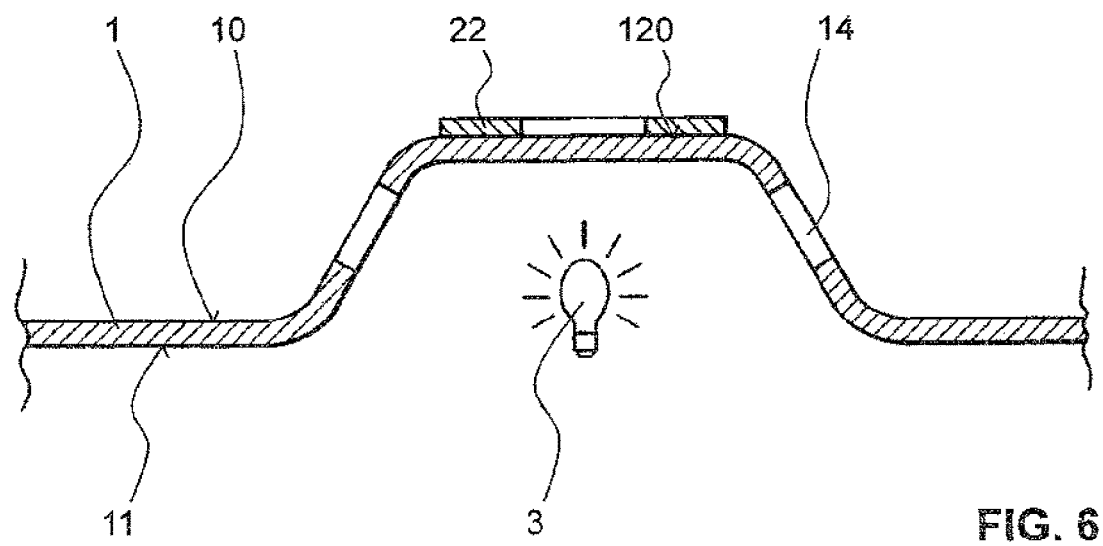
FIG. 6 shows a cross-sectional view along the line VI-VI through a part of the display element shown in FIG. 5.

The embodiment represented in FIGS. 5 and 6 differs from the one shown in FIGS. 1 and 2 in particular in that the graphical elements 2 are configured not by means of recesses 20 but by means of a layer 22 applied onto the upper surfaces 120 of the elevations 12. The layer 22 is preferably made of a different material than the cover 1. The layer 22 may, in particular, have a different surface structure and/or color than the visible side 10 of the cover 1. The layer 22 may, for example, be applied by means of an adhesive or an adhesion promoter, or printed, on the visible side 10 of the cover 1. In the present embodiment, in contrast to the embodiment shown in FIGS. 1 and 2, the display element does not have a carrier layer.

Figure 7:
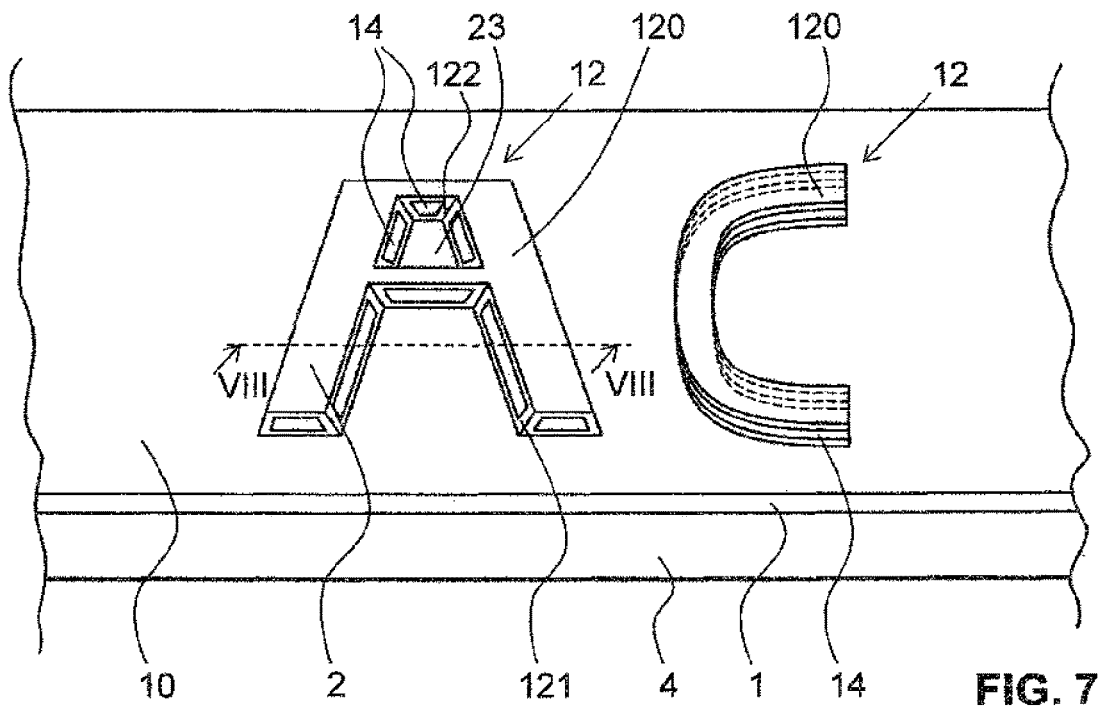
FIG. 7 shows a perspective partial view obliquely from above of an illuminable display element according to a third embodiment according to the invention.
Figure 8:
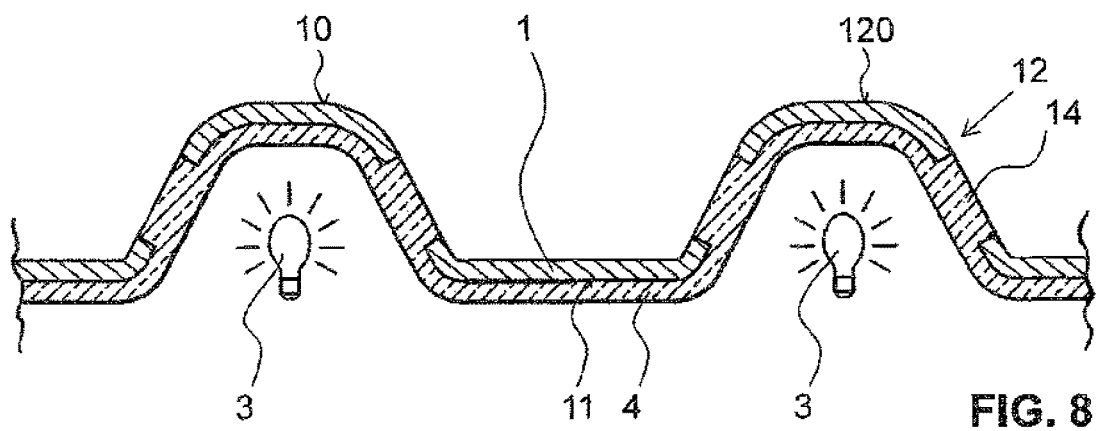
FIG. 8 shows a cross-sectional view along the line VIII-VIII through a part of the display element shown in FIG. 7.

A third embodiment according to the invention of an illuminable display element is shown in FIGS. 7 and 8. The elevations 12 are in this case respectively configured in such a way that they respectively form a graphical element 2 because of their shape. The graphical elements 2 are in this case respectively formed by the shape of the planar-configured upper surfaces 120 of the elevations 2. Below these upper surfaces 120, or below the graphical elements 2, in this embodiment as well openings 14, which partially or even fully enclose the graphical elements 2, are respectively provided in the side surfaces 121 of the elevations 12. The elevation 12 shown on the left-hand side of FIG. 7, which forms the letter A, has, in the region of the island-shaped region 23 of the graphical element 2, an inner surface 122 which extends circumferentially downward from the upper surface 120.

Further openings 14 are provided within the inner surface 122.

As can be seen from FIG. 8, a carrier layer 4, which engages in the openings 14 in the regions of the elevations 12 in such a way that the carrier layer 4 is flush with its upper side with the adjacent visible side 10 of the cover 1, is applied on the rear side 11 of the cover 1 in the present exemplary embodiment.

Figure 9:
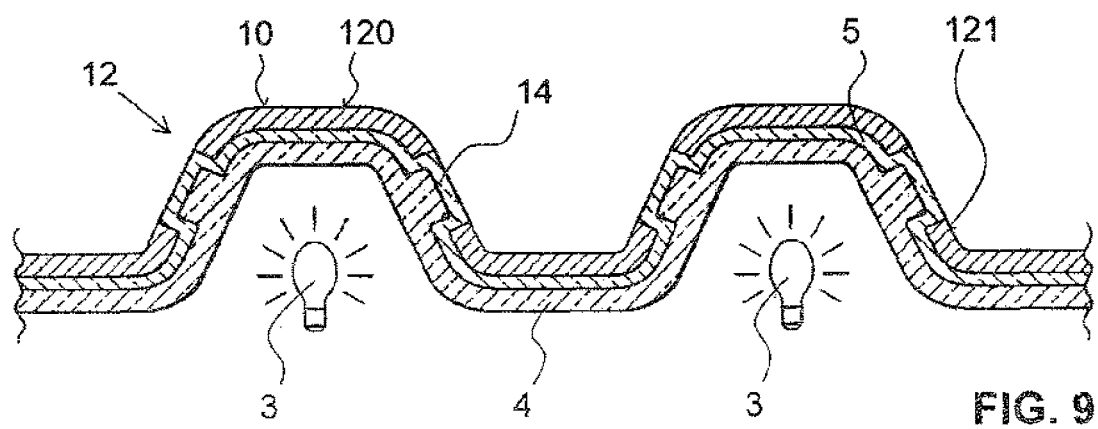
FIG. 9 shows a cross-sectional view of a part of an illuminable display element according to a fourth embodiment according to the invention.

As shown in FIG. 9, a foil 5 may be provided between the rear side 11 of the cover 1 and the carrier layer 4. The foil 5, which is configured to be substantially thinner than respectively the carrier layer 4 and the cover 1, engages in the openings 14 to precisely such an extent that it is flush with its upper side with the visible side 10 of the cover 1.

The lighting element 3 is preferably a light-emitting diode. It is however also conceivable to use a luminous foil, in particular an electroluminescent foil or an OLED, or an incandescent bulb. If a luminous foil is used, this may be provided as a foil 5 between the cover 1 and the carrier layer 4, or as an alternative it may be applied on the rear side of the carrier layer 4.

Figure 10:
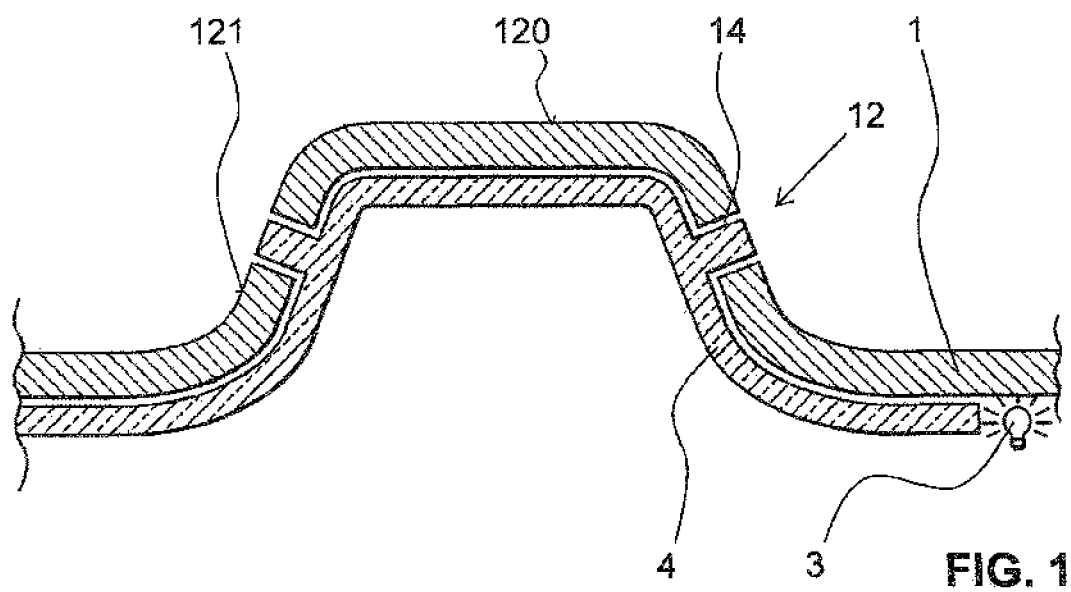
FIG. 10 shows a cross-sectional view of a part of an illuminable display element according to a fifth embodiment according to the invention.
Figure 11:
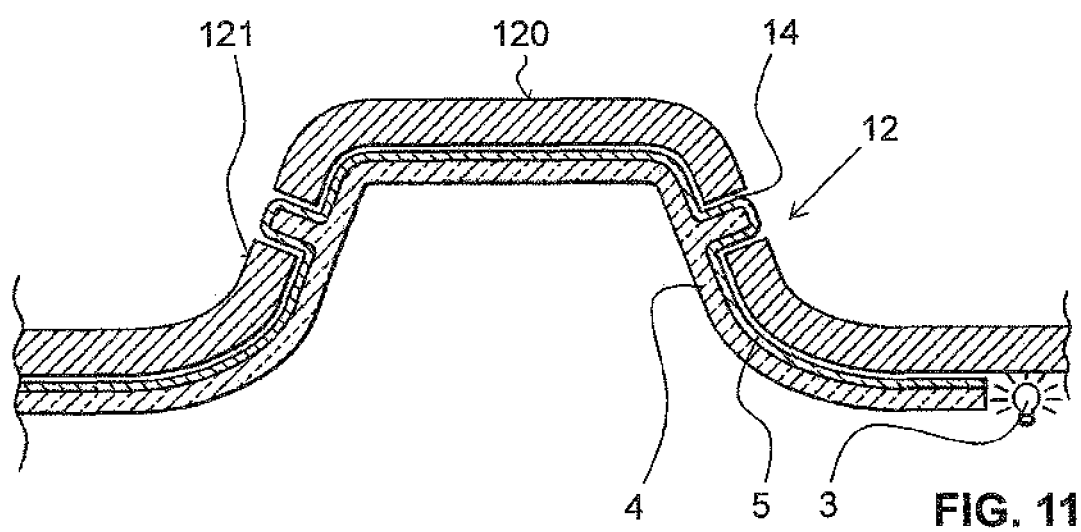
FIG. 11 shows a cross-sectional view of a part of an illuminable display element according to a sixth embodiment according to the invention.

The lighting element 3 may respectively, as is the case in the embodiments shown in FIGS. 1 to 9, be arranged directly in the regions of the elevations 12 on the rear side of the cover 1. Nevertheless, embodiments in which the lighting element 3, as shown in FIGS. 10 and 11, is arranged outside the regions of the elevation 12 are also possible. The light emitted from the lighting element 3 may then normally not travel on a direct path from the lighting element 3 to the openings 14, or the recesses 20 if there are any. So that the light can nevertheless reach the openings 14 or the recesses 20, the carrier layer 4 is then configured as a light guide, within which the light emitted by the lighting element 3 is correspondingly guided. To this end, reflective elements may in particular be provided in or on the carrier layer 4, so that the light guided from the lighting element 3 to the openings 14 or the recesses 20 changes its direction at least once. In this embodiment, it is possible in particular for the display element to have only a single lighting element 2, which is configured in order to illuminate the openings 14 or recesses 20 of a multiplicity of elevations. Of course, a foil 5 may also be arranged between the cover 1 and the carrier layer 4 in this embodiment (see FIG. 11). Advantageously, the lighting element 3 is embedded in the carrier layer 4, or the latter is injection-molded around it.

The carrier layer 4 and/or the foil 5 may be configured as a diffuser for scattering the light passing through the openings 14 or the recesses 20.

Figure 12:
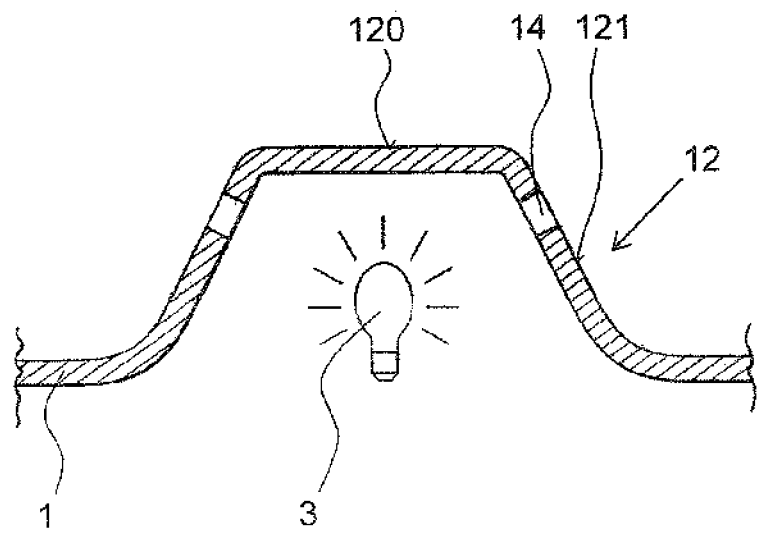
FIG. 12 shows a cross-sectional view of a part of an illuminable display element according to a seventh embodiment according to the invention.
Figure 13:
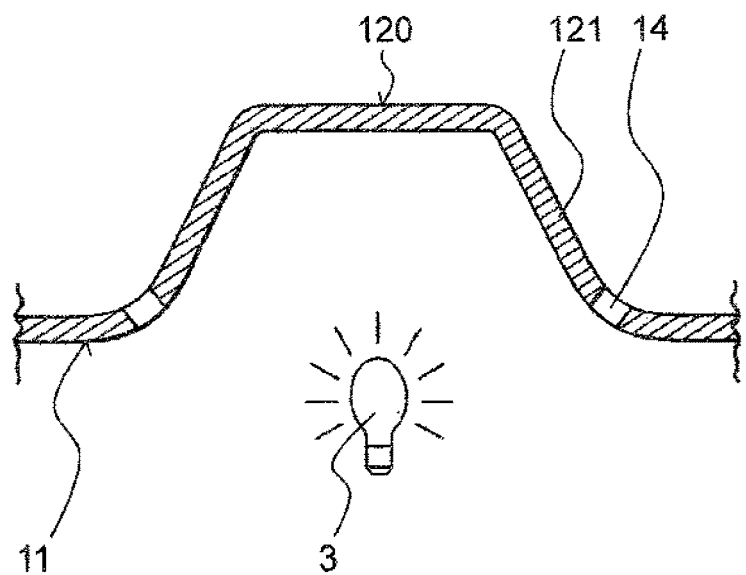
FIG. 13 shows a cross-sectional view of a part of an illuminable display element according to an eighth embodiment according to the invention.

As in the case of the display element of the embodiment shown in FIG. 6, the display element shown in FIG. 12 has neither a carrier layer nor a foil on the rear side of the cover 1. In contrast to the embodiment shown in FIG. 6, the graphical element is in this case formed by the shape of the elevation 12, i.e. the shape of the upper layer 120 corresponds precisely to that of the graphical element. A display element configured in such a way is particularly simple to produce.

In the embodiment shown in FIG. 12, the openings 14 are arranged in an upper region of the elevation 12 close to the upper surface 120. The embodiment shown in FIG. 13 differs from that of FIG. 12 in that the openings 14 are arranged in a lower region of the elevation 12 in the transition region of the side surface 121 to the horizontally configured part of the cover 1, which encloses the elevation 12.

Figure 14:
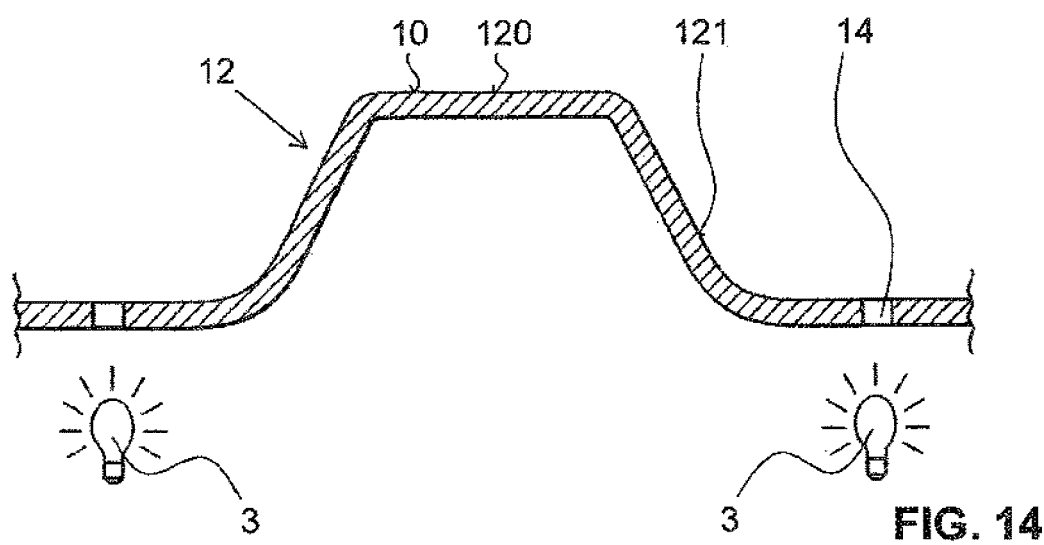
FIG. 14 shows a cross-sectional view of a part of an illuminable display element according to a ninth embodiment according to the invention.

In the embodiment shown in FIG. 14, the openings 14 are even arranged outside the elevation 12. The elevation 12, which forms the graphical element because of its shape, is bordered here by the openings 14.

Figure 15:
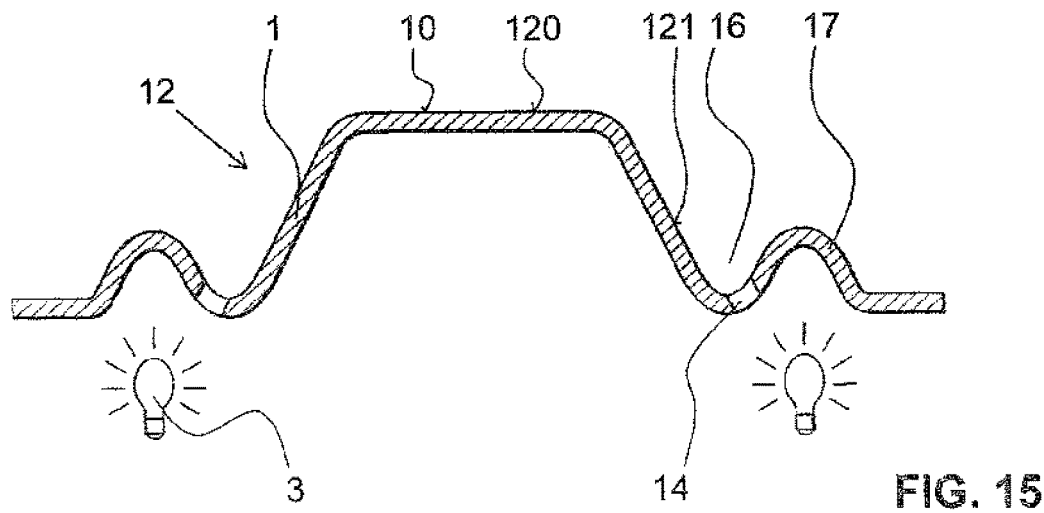
FIG. 15 shows a cross-sectional view of a part of an illuminable display element according to a tenth embodiment according to the invention.

In the embodiment shown in FIG. 15, a ridge 17 extending around the elevation 12 is formed directly adjacent to the elevation 12 in the cover 1, this ridge together with the side surface 121 of the elevation 12 forming a circumferential channel 16. As seen in cross section, the cover 1 is therefore configured with a wave shape or S-shape in the region directly adjacent to the elevation 12. In a lower region of the elevation 12 within the channel 16, the cover 1 has openings 14 which are arranged in such a way that light which is emitted by the lighting element 3 strikes the side surface 121 of the elevation 12 with perpendicular passage through the openings 14. A particularly attractive optical effect is therefore obtained.

Figure 16:
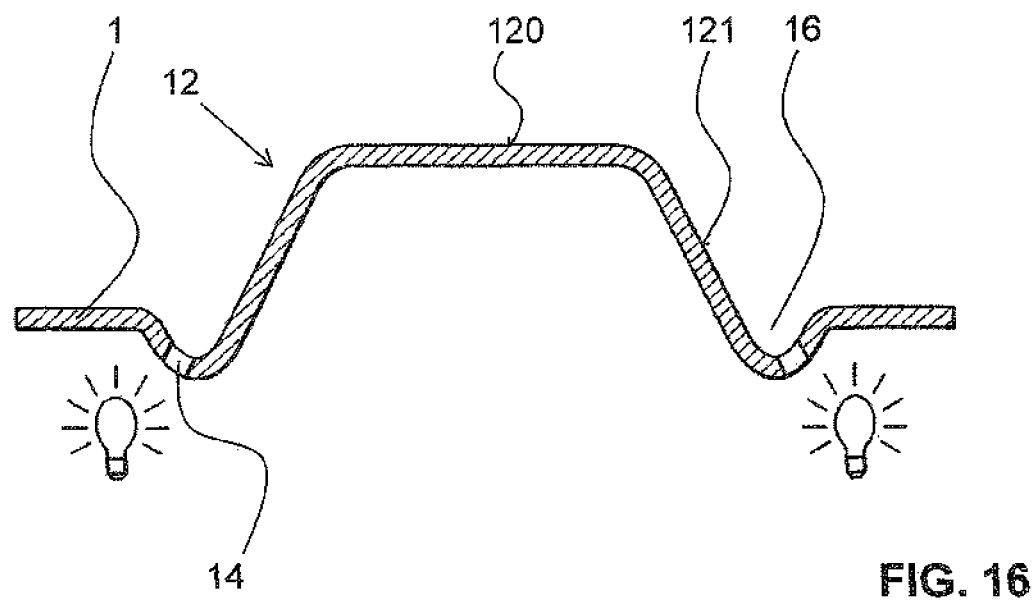
FIG. 16 shows a cross-sectional view of a part of an illuminable display element according to an eleventh embodiment according to the invention.

In one embodiment, which is shown in FIG. 16, a channel 16 extending at least partially around the elevation 12 is formed by the side surface 121 extending to below the plane of the part of the cover 1 enclosing the elevation 12. The openings 14 are in this case arranged in the region of the channel 16 in the cover 1 in such a way that light, which passes through the openings 14 in a perpendicular direction, strikes the side surface 121. The elevation 12 can therefore be exposed laterally to the light from the lighting element 3.

Figure 17:
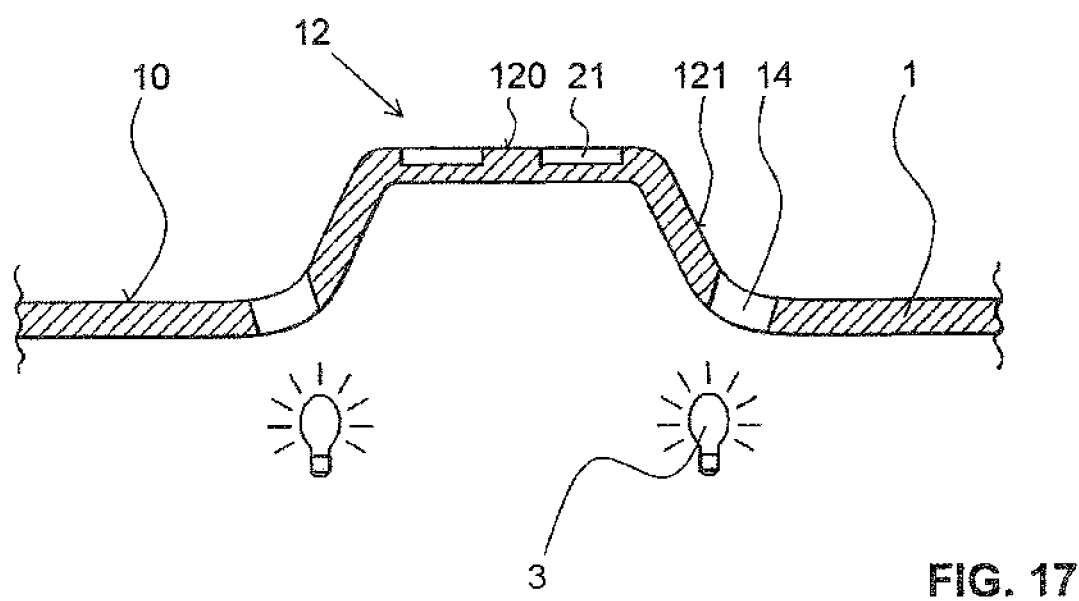
FIG. 17 shows a cross-sectional view of a part of an illuminable display element according to a twelfth embodiment according to the invention.

In the embodiment shown in FIG. 17, the openings 14 are arranged in the transition region of the side surface 121 to the horizontal part of the cover 1 enclosing the elevation 12. A relief-like structure 21, which is formed in the upper surface 120 of the elevation 12, in this case forms the graphical element.

Figure 18:
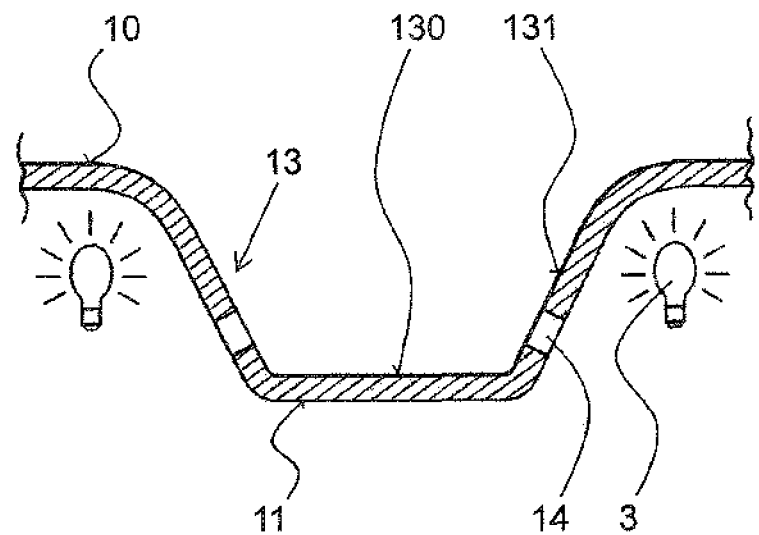
FIG. 18 shows a cross-sectional view of a part of an illuminable display element according to a thirteenth embodiment according to the invention.
Figure 19:
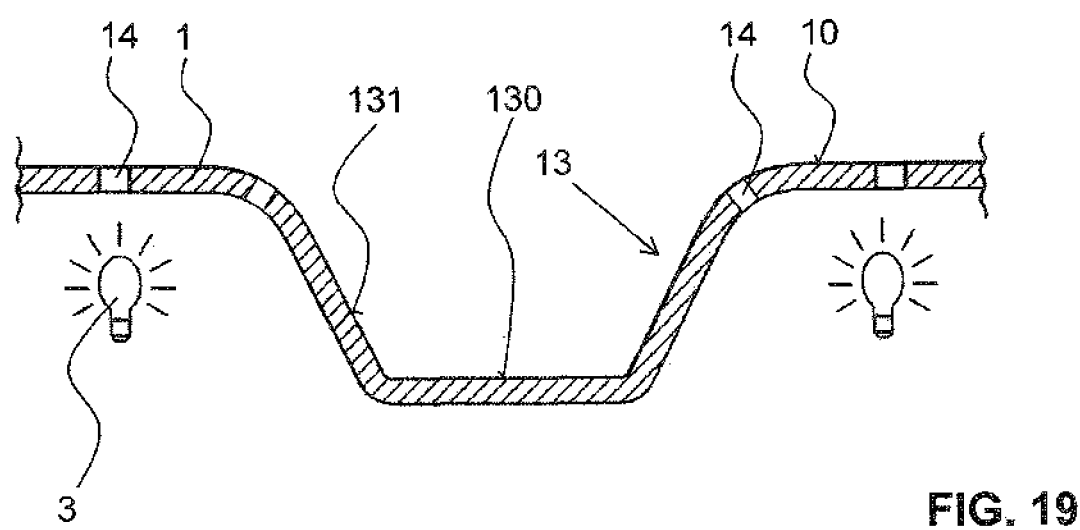
FIG. 19 shows a cross-sectional view of a part of an illuminable display element according to a fourteenth embodiment according to the invention.
Figure 20:
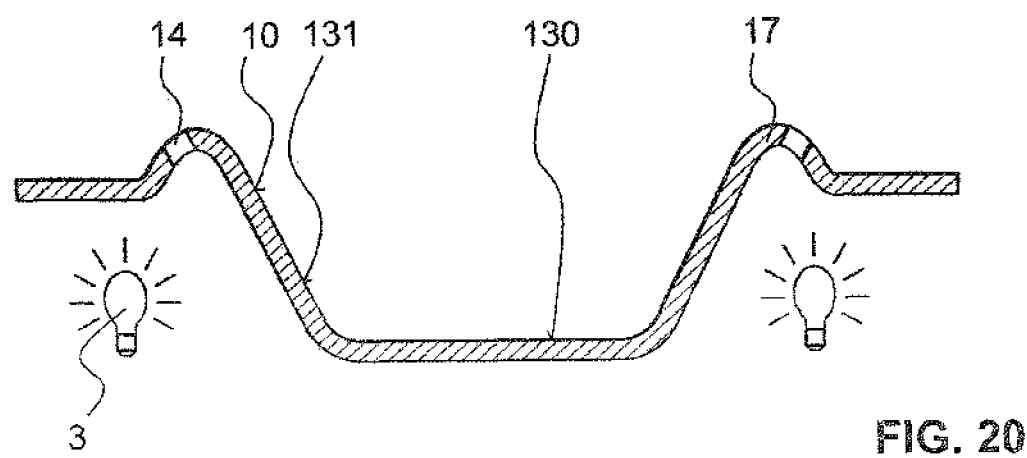
FIG. 20 shows a cross-sectional view of a part of an illuminable display element according to a fifteenth embodiment according to the invention.

The embodiments shown in FIGS. 18 to 20 differ from the embodiments shown in FIGS. 1 to 17 in that the graphical elements are respectively arranged not within an elevation but within a depression 13 of the cover 1. In the embodiments of FIGS. 18 to 20, the depression is respectively configured in such a way that it forms a graphical element because of its shape. In all three embodiments, therefore, the depression 13 respectively has a lower surface 130, the visible side or upper side of which respectively has the shape of a graphical element. A side surface 131 respectively extends circumferentially upward from the planar-configured lower surface 130. The side surface 131 in this case widens upward slightly.

In the embodiment shown in FIG. 18, the openings 14 are arranged in a lower region of the side surface 131 close to the lower surface 130.

In the case of the display element shown in FIG. 19, openings 14 lie outside the depression 13 in the part of the cover 1 extending along the horizontal direction adjacent to the depression 13. Further openings 14 are furthermore formed in the transition region from the side surface 131 to the part of the cover 1 enclosing the depression 13.

In the embodiment shown in FIG. 20, the side surface 131 extends upward to above the part of the cover 1 enclosing the depression 13. In this way, a ridge 17, within which the openings 14 are arranged, is formed bordering the depression 13.

The above invention is of course not restricted to the present embodiments, and a large number of variants are possible. In particular, it is also possible to combine the various features of the embodiments above with one another. Thus, of course, a carrier layer and/or a foil may also respectively be applied on the rear side of the cover 1 in the case of the display elements represented in FIGS. 18 to 20, in which the graphical element is respectively arranged within a depression. In all the exemplary embodiments, for each elevation or depression, it is possible to provide only a single opening, which at least partially or fully encloses the graphical element, or a plurality of openings which together at least partially or fully enclose the graphical element may be provided. Within the depressions 13, it is naturally also possible to provide recesses or relief-like structures, which form the graphical element. A large number of further variants and configurations may be envisioned.

LIST OF REFERENCES

| | | | |
|---|---|---|---|
| 1 | Cover | | |
| 10 | visible side | 2 | graphical element |
| 11 | rear side | 20 | recess |
| 12 | elevation | 21 | relief-like structure |
| 120 | upper surface | 22 | layer |
| 121 | side surface | 23 | island-like region |
| 122 | inner surface | 24 | branch |
| 13 | depression | | |

-continued

LIST OF REFERENCES

| | | | |
|---|---|---|---|
| 130 | lower surface | 3 | lighting element |
| 131 | side surface | | |
| 14 | opening | 4 | carrier layer |
| 15 | web | | |
| 16 | channel | 5 | foil |
| 17 | ridge | | |

The invention claimed is:

1. An illuminable display element, in particular for a vehicle, comprising:
a first layer comprising a two-dimensionally extending cover formed overall in one piece and comprising a visible side, a rear side and at least one through-hole;
at least one graphical element which is provided and/or formed on the visible side of the cover;
a lighting element which is used to illuminate the through-hole;
a second layer comprising a carrier layer which is disposed on the rear side of the cover at least in the region of the at least one through-hole;
a third layer comprising at least one film which is a separate structure disposed between the carrier layer and the cover and which is disposed on the rear side of the cover in such a way that the at least one film extends at least partially into the at least one through-hole; and
wherein the graphical element is at least partially enclosed by the at least one through-hole in such a way that light from the lighting element can at least partly shine around the graphical element,
wherein the cover has at least one elevation extending upward, within which the graphical element is arranged above the at least one through-hole, and/or wherein the cover has at least one depression extending downward, within which the graphical element is arranged below the at least one through-hole,
wherein the first, second and third layers are separate layers,
wherein the carrier layer and the at least one film are configured to be optically transparent at least in regions, in order to form a light guide, which is used to guide light emitted by the lighting element to the at least one through-hole, and
wherein the carrier layer and the at least one film extends from the rear side of the cover around an edge at an opening of the through hole and into the at least one through-hole.

2. The illuminable display element as claimed in claim 1, wherein the elevation and/or the depression is substantially enclosed by the at least one through-hole.

3. The illuminable display element as claimed in claim 1, wherein the elevation has an upper surface, or the depression has a lower surface, within which the graphical element is arranged, as well as a side surface which extends essentially circumferentially from the upper surface downward or from the lower surface upward, the at least one through-hole being arranged within this side surface.

4. The illuminable display element as claimed in claim 1, wherein the at least one through-hole is arranged outside the elevation and/or the depression.

5. The illuminable display element as claimed in claim 4, wherein the at least one through-hole is arranged within a region of the cover which is inclined with respect to the elevation in such a way that the elevation can be exposed laterally to the light from the lighting element.

6. The illuminable display element as claimed in claim 1, wherein the at least one elevation and/or the at least one depression is configured in such a way that it forms the graphical element by virtue of its shape.

7. The illuminable display element as claimed in claim 1, wherein the elevation and/or depression comprises at least one recess which can be illuminated by the lighting element and is configured in such a way that it at least partially forms the graphical element.

8. The illuminable display element as claimed in claim 1, wherein, at least in the region of the through-hole, the film comprises a surface coating which leads to at least approximately the same optical impression as the material from which the cover is made.

9. The illuminable display element as claimed in claim 1, wherein reflection elements are provided on the light guide, which are configured and arranged in such a way that the light guided to the at least one through-hole changes its direction at least once.

10. The illuminable display element as claimed in claim 1, wherein the graphical element is at least partially formed by a relief structure.

11. The illuminable display element as claimed in claim 1, wherein the graphical element is at least partially formed by at least one layer applied onto the visible side of the cover.

12. The illuminable display element as claimed in claim 1, wherein the illuminable display element is a trim strip, and in particular a sill strip of a vehicle.

13. A method for producing an illuminable display element having a graphical element comprising at least the following steps:
providing a first layer comprising a two-dimensionally extending cover formed overall in one piece and having a visible side and a rear side;
forming at least one elevation extending upward and/or at least one depression extending downward in the cover by means of shaping the cover; and
forming at least one through-hole in the cover;
applying a second layer comprising a carrier layer on the rear side of the cover at least in the region of the at least one through-hole;
applying third layer comprising a at least one film on the rear side of the cover between the carrier layer and the cover and at least in the region of the at least one through-hole in such a way that the at least one film extends at least partially into the at least one through-hole;
wherein the carrier layer and the at least one film are configured to be optically transparent at least in regions, in order to form a light guide, which is used to guide light emitted by a lighting element to the at least one through-hole,
wherein the elevation and/or the depression are configured and/or arranged in such a way that the graphical element is arranged within the elevation or depression,
wherein the first, second and third layers are separately formed;
wherein the graphical element and the at least one through-hole are arranged and configured with respect to one another in such a way that the at least one through-hole is arranged below the graphical element in the case of an elevation and above the graphical element in the case of a depression, and at least partially encloses this element, and
wherein the carrier layer and the at least one film are applied on the rear side of the cover such that the carrier layer and the at least one film extends from the rear side of the cover around an edge at an opening of the through hole and into the at least one through-hole.

14. The method as claimed in claim 13, wherein the carrier layer is applied on the rear side of the cover by means of an injection molding method.

15. The method as claimed in claim 13, wherein the carrier layer is applied under pressure on the rear side of the cover in such a way that the pressure forms the at least one elevation and/or the at least one depression in the cover.

16. The illuminable display element as claimed in claim 1, wherein the cover has at least one recess and within said recess is an island-shaped region which is fully enclosed by the graphical element.

17. The method as claimed in claim 13, wherein the cover is formed with at least one recess and the method further comprises, forming within said recess is an island-shaped region which is fully enclosed by the graphical element.

* * * * *